(12) United States Patent
Boyce et al.

(10) Patent No.: US 8,345,845 B2
(45) Date of Patent: Jan. 1, 2013

(54) PUBLIC COMMUNICATIONS INTERCOM SYSTEM

(75) Inventors: Charles Boyce, New York, NY (US); David Boyce, Damascus, PA (US)

(73) Assignee: Boyce Technologies, Inc., New York, NY (US)

( * ) Notice: Subject to any disclaimer, the term of this patent is extended or adjusted under 35 U.S.C. 154(b) by 135 days.

(21) Appl. No.: 12/932,256

(22) Filed: Feb. 22, 2011

(65) Prior Publication Data

US 2012/0213351 A1    Aug. 23, 2012

(51) Int. Cl.
*H04M 1/60* (2006.01)
*H04M 9/00* (2006.01)
*H04M 1/00* (2006.01)

(52) U.S. Cl. ......... 379/167.04; 379/167.11; 379/167.14; 379/453; 379/454; 52/27.5

(58) Field of Classification Search ............. 379/167.03, 379/167.04, 167.05, 167.06, 167.07, 167.11, 379/167.14, 167.15, 428.01, 430, 453, 454; 52/27, 27.5

See application file for complete search history.

(56) References Cited

U.S. PATENT DOCUMENTS

| | | | |
|---|---|---|---|
| 4,724,538 A | 2/1988 | Farrell | |
| 5,465,296 A | 11/1995 | McMonagle, Jr. et al. | |
| 5,963,631 A | 10/1999 | Fazio et al. | |
| 6,055,438 A | 4/2000 | Winner, Jr. | |
| 6,060,979 A | 5/2000 | Eichsteadt | |
| D438,186 S | 2/2001 | Rodgers et al. | |
| 6,263,069 B1 | 7/2001 | Schulze | |
| 6,289,082 B1 | 9/2001 | Scheiding | |
| 6,845,127 B2 | 1/2005 | Koh | |
| 7,039,393 B1 * | 5/2006 | Kite | 455/412.2 |
| 7,227,945 B2 * | 6/2007 | Keppel et al. | 379/453 |
| 7,428,002 B2 | 9/2008 | Monroe | |
| 7,644,039 B1 | 1/2010 | Magee et al. | |
| 2006/0222153 A1 * | 10/2006 | Tarkoff et al. | 379/159 |
| 2008/0304628 A1 | 12/2008 | Rowe et al. | |
| 2009/0103704 A1 * | 4/2009 | Kitada et al. | 379/167.14 |
| 2010/0002845 A1 | 1/2010 | Zerillo et al. | |

* cited by examiner

*Primary Examiner* — Binh Tieu
(74) *Attorney, Agent, or Firm* — MacCord Mason PLLC

(57) ABSTRACT

An improved public intercom system is described which has a sealed enclosure including an extruded chassis having a front wall and a rear wall. The front wall has an interface panel and a viewing panel mounted within cutouts. A plurality of axially aligned module cover plates supporting system components are mounted over cutouts in the rear wall. The interface includes a speaker, a microphone, a call initiation means, and a camera positioned to acquire images of the area in front of the interface panel. One of the cover plates including an outer surface with heat dissipation protrusions, with a blower located on said rear wall being oriented to direct air across the protrusions to extract heat from the chassis interior. A two-way communication means is mounted on a module plate and programmed to initiate a call to a pre-programmed receiver responsive to a command from the call initiation means.

20 Claims, 3 Drawing Sheets

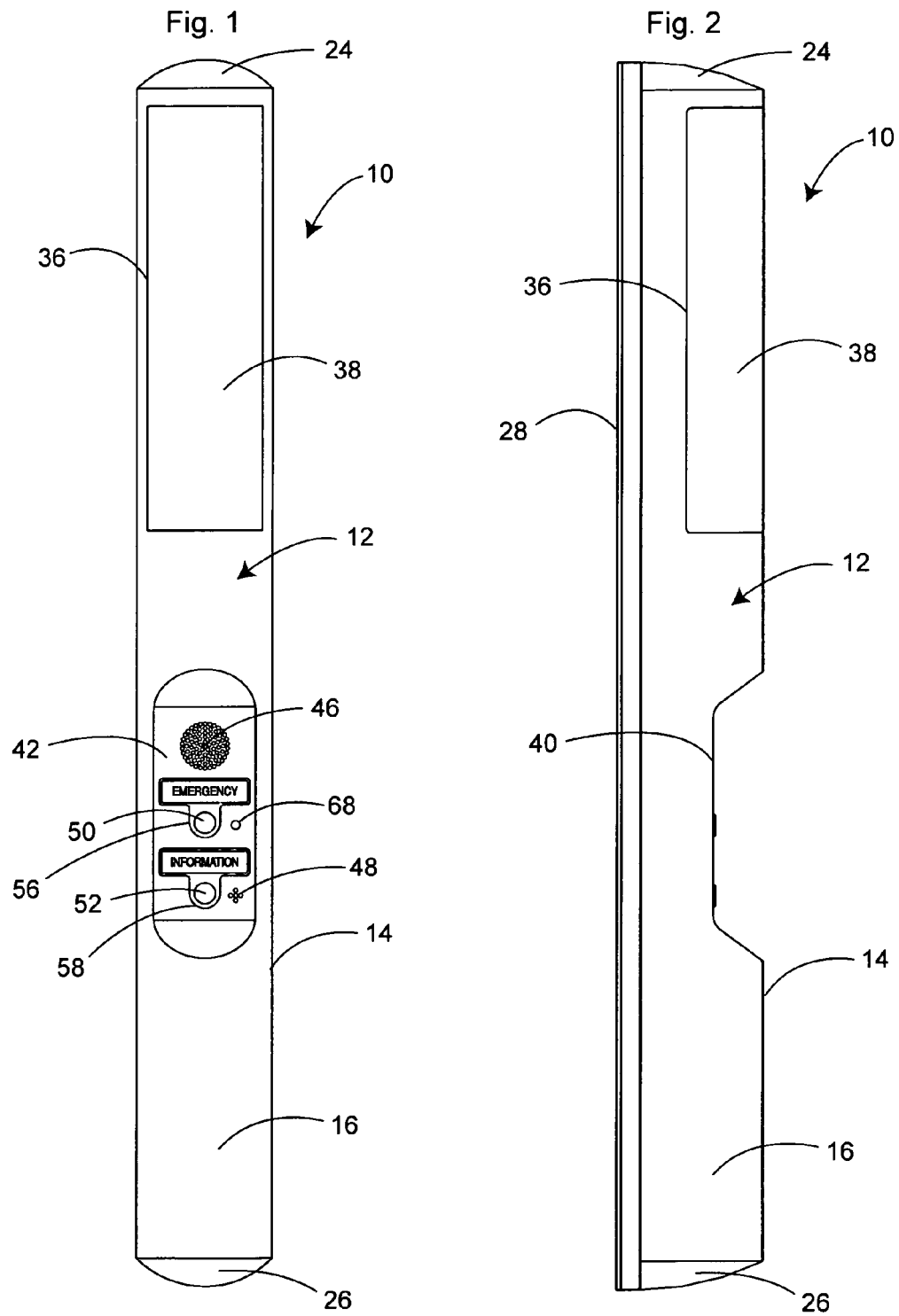

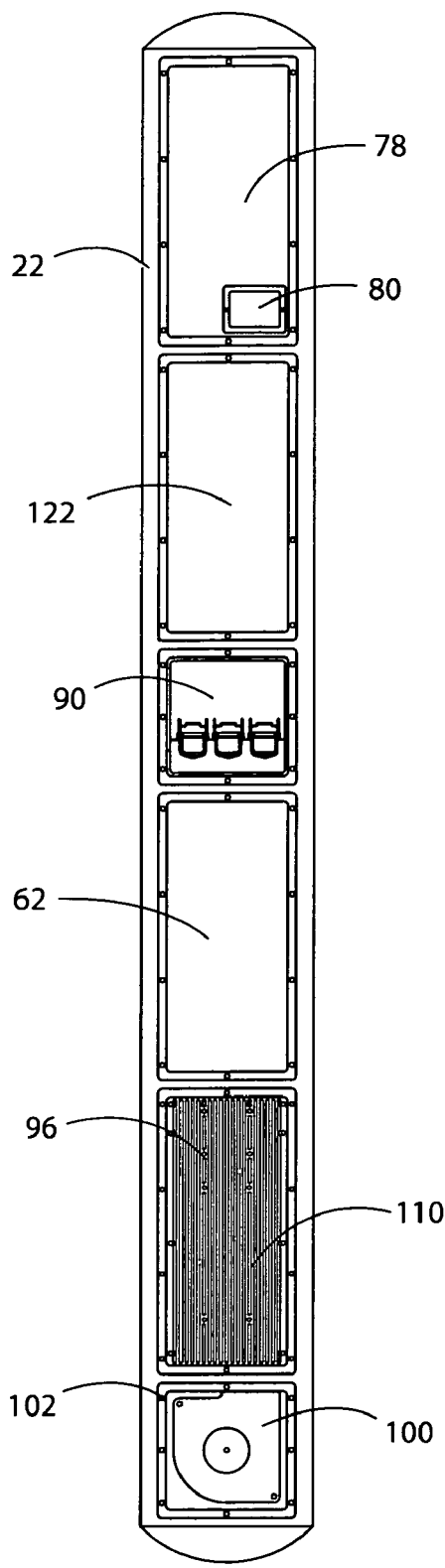
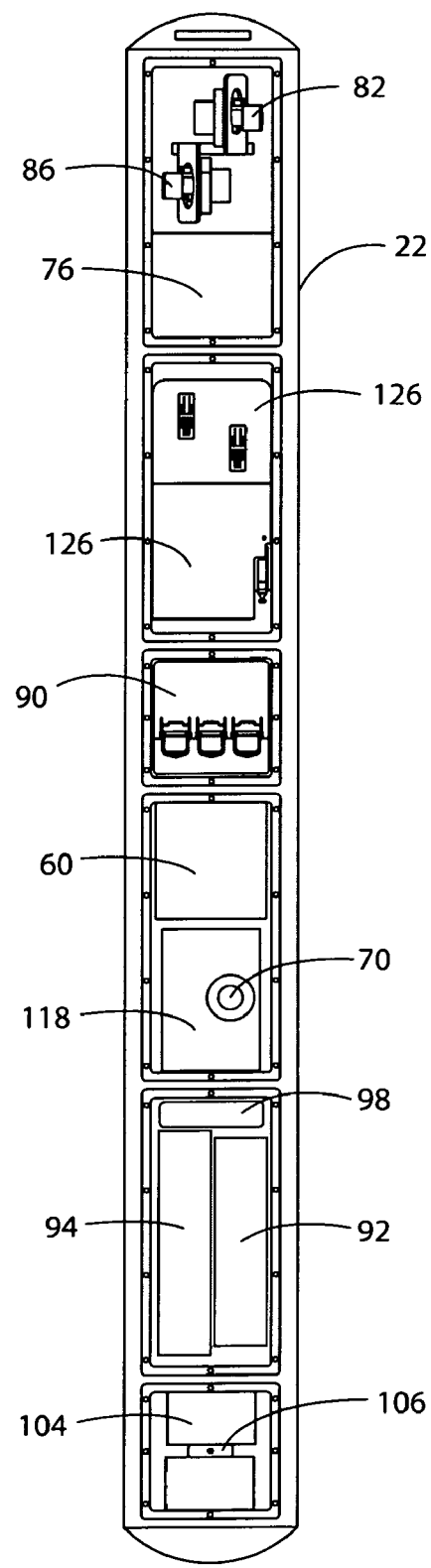

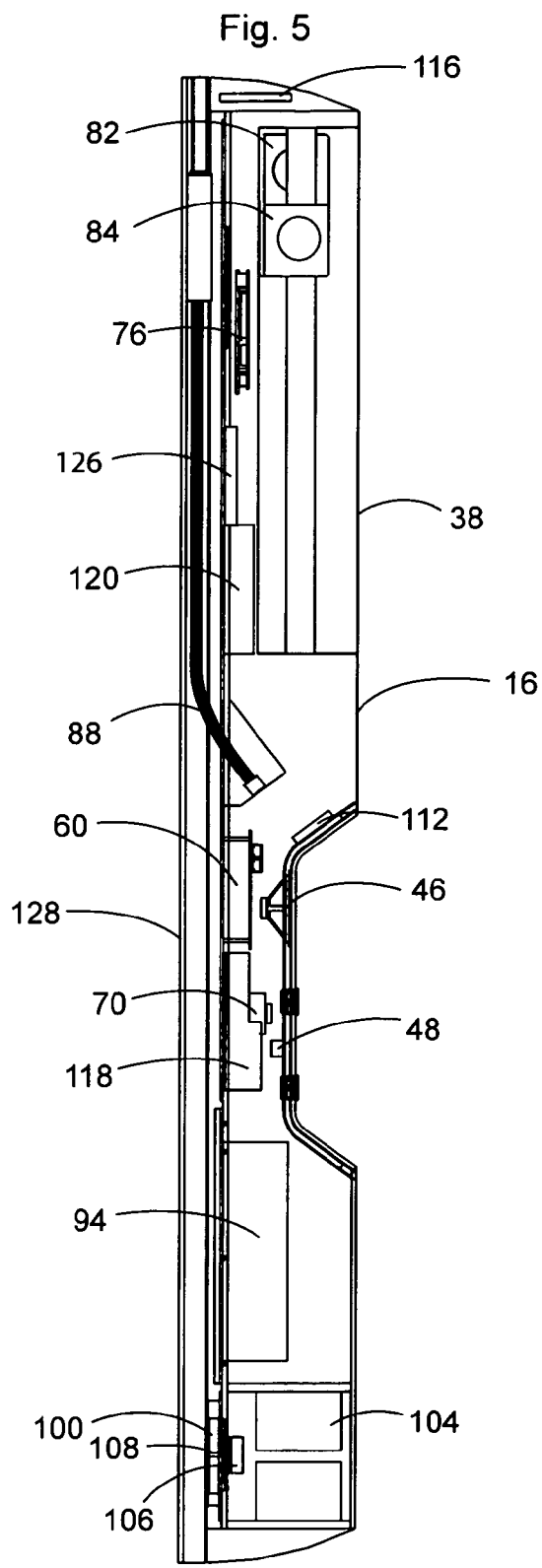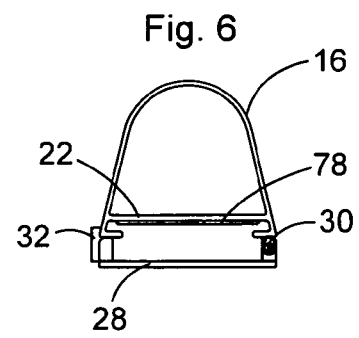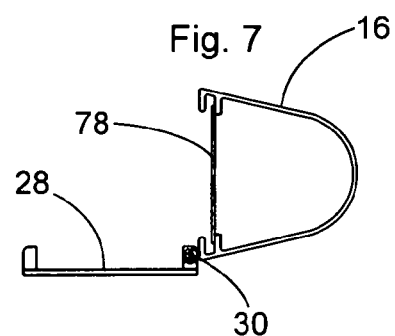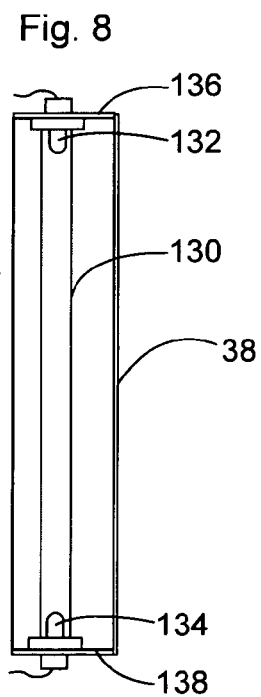

PUBLIC COMMUNICATIONS INTERCOM SYSTEM

BACKGROUND OF THE INVENTION (1) Field of the Invention

The present invention relates to an improved public communications intercom system designed for installation in transit terminals and other public locations to enable communication by individuals with authorities. In particular, the present invention relates to an intercom system constructed for resistance to the elements and vandalism, and for ease of maintenance. The system also incorporates features not available in conventional public intercom systems.

(2) Description of the Prior Art

Public communication intercom systems or terminals, often referred to as help point terminals, help point intercoms, and often referred to herein simply as intercom systems, are provided by municipal authorities and located in public areas, such as transit terminals, public parks, sidewalks, etc., for use by individuals who need information or assistance, or otherwise need to communicate with municipal authorities. Generally, these intercom systems are comprised of a housing designed to be vandal resistant that encloses a telephonic communication means preset to connect with the authorities.

The housing generally includes a button or other means for initiating a call, a microphone so that the individual can talk to the authorities, and a loudspeaker so that the individual can hear the authorities. The microphone and loudspeaker are normally located behind a perforated plate so that they are physically inaccessible to the caller. The telephone system can be a VoIP network connected via the Internet to the authorities. Other features, such as a camera activated upon call placement to enable viewing of the caller by the authorities can also be incorporated into the housing. The system may also include a light or beacon to assist users and authorities in visually locating the system's incident.

While numerous designs of intercom systems are in use, there is still a need for in intercom that has a high degree of vandal resistance, and which is relatively easy to maintain and upgrade. There is also an opportunity to incorporate features not heretofore available in such systems to enhance their utility to municipal authorities.

SUMMARY OF THE INVENTION

The present invention is directed to an improved intercom system for use by the public in communicating with municipal authorities, e.g., the police, public safety personnel, or public information personnel. The system, designed for installation in public areas is highly resistant to vandals and the elements, and can be readily maintained and serviced. The system may further include optional features to enhance the utility of the system to the user and to the authorities.

Generally, the present invention relates to an intercom system comprised of a specially designed housing, a user interface, and a communication means enabling two-way communication between the call and municipal authorities. Depending on the system requirements, other components such as a video capture and recording assembly, a thermal dissipation system, an internal power source, and audio assistance means for the hearing impaired may be incorporated into the system.

An essential feature of the present system is provision for a construction that is impervious to the elements, e.g. water and dust, which is resistant to vandals, and which is relatively easy to maintain and repair. These requirements are met by the housing used to enclose the electronic, video and other components of the system. Generally, the system enclosure is comprised of a seamless, monolithic chassis having a front wall and a back wall, and a mounting plate to attach the chassis to a surface. The front wall of the chassis includes a pressure fitted beacon lens and dashboard for communication interface, while the back wall includes a plurality of cutouts for insertion and removal of modular components from the chassis interior which can vary in length to accommodate required modules and/or floor mounting. Each cutout is covered by a watertight cover, which may include a gasket to ensure a watertight seal. The covers are preferably held in place for thumbscrews to facilitate ease of removal. The chassis may be molded, but preferably is a one-piece extruded, elongated aluminum chassis.

The front and back walls may be integrally joined by side walls or, as shown in the preferred embodiment, the enclosure can having a planar back wall and a curved front wall with side edges integral with the side edges of the back wall. The chassis is attached to mounting plate using elongated tapered holes to retain studs with heads. Lock pin engages mounting plate to prevent chassis from being lifted out of position. Optionally, the chassis is attached to a mounting plate with a hinge along one side of the back wall. A lock, normally at the opposite side of the back wall, releasibly secures the chassis to the mounting plate. The upper and lower ends of the chassis are capped by top and bottom caps, respectively.

The user interface is designed to enable two-way communication and includes speaker and microphone. Communication is initiated with a call initiation means, such as a button mounted in the panel. Preferably, the button is a touch activated button with no moving parts, e.g., a piezo switch. The interface may include an interface mounting panel of a vandal resistant material, e.g., an acrylic based solid surfacing material sold under the trademark Corian, which is mounting within an interface cutout in the chassis front wall, with the speaker being mounted behind a perforated plate in the panel.

To aid in location of the call button, illuminated call initiation locator can be mounted adjacent the button. For example, for a button, the locator can be a clear polycarbonate ring mounted around the button and fused to the Corian panel. The ring can be illuminated by LEDs mounted in openings through the panel behind the ring. The LEDs can be of different colors or infinitely color controlled with RGB LEDs to indicate the system status. For example, blue can indicate "ready for service"; flashing green can indicate that a call has been initiated; and solid green can indicate that the call has been received.

The user interface can also include a camera to enable authorities to view the person initiating the call. The camera is mounted behind the panel with the lens viewing the exterior through a neutral density dot that is heat formed and fused into the panel. The camera can be activated by the authorities, automatically activated when the call is initiated, or always on. The video from the camera can be recorded to storage within the housing and/or streamed to the communication room where the authorities are located, or to another location.

Various designs of two-way telephonic communication means can be employed. In the preferred embodiment, the communication means is a commercially available, ADA compliant VOIP (Voice over Internet Protocol) phone system that is a vandal-resistant, full-duplex, intelligent hands-free emergency assistance phone providing communications utilizing SIP (Session initiation Protocol). The phone may be programmed via a web browser or remotely supervised. A suitable phone is the IP6000, manufactured by Emcom Systems of Trenton, N.J.

When the call button is pressed, the phone places a call to a receiving communication device whose access information has been previously programmed into the phone. The receiving communication device, e.g., at the municipal authority location, answers to complete the connection. An external 6 VDC battery backup is attached to the phone for use if primary power fails. The phone can also be powered via a POE (Power over Ethernet) connection.

The user interface may also include a telecoil or audio assistance means for the hearing impaired. The telecoil may include a first coil imbedded in the user interface panel and a second mounted near the top of the chassis. The telecoils may be of multiple turns of lacquered wire, e.g., the interface coil may be of eight turns of #22 AWG wire and the upper coil may be of five turns of #22 AWG wire. The telecoils are connected to and drive by a loop amplifier, such as an Amphetronic HLS-02 loop amplifier. The telecoil is used to amplify the sound to a telecoil enabled hearing aid worn by the user as the user stands in front of the interface panel.

Power is supplied to the system by an external AC power source transformed to 48V DC. The supply also includes a UPS and battery backup.

The system housing is sealed for external air to protect internal equipment from dust, dirt and moisture, as well as to deter vandalism. Therefore, heat built up within the housing due to exterior heating, e.g., from sunlight, and from internal heating due to the electronic components, must be dissipated to prevent overheating. Since the housing is preferably constructed of aluminum, which has high heat conductivity, some of the heat is conducted outwardly though the housing walls.

Where additional heat removal is required, the chassis can include fins with a blower positioned to blow air across the fins. When more heat removal is required, the present system can incorporate a thermal dissipation system comprised on an internal "clean" blower fan and an external "dirty" blower fan. The internal fan is mounted within the chassis, preferably adjacent the UPS power module, which is the source of greatest heat generation. The internal fan pulls air from the top of the chassis and forces the air downward to evenly distribute the air within the chassis.

The external fan or blower is preferably mounted on the rear of the chassis on a shaft extending through the chassis back wall from a motor within the chassis interior. The external blower directs air over heat sinks on the backs of one or more module plates mounted over the chassis rear cutouts.

The utility of the system can be further enhanced by the inclusion of two surveillance cameras mounted in the upper part of the chassis behind a transparent Lexan shield to provide remote viewing not provided by the interface or platform camera. One of the cameras is angled toward one side of the chassis, while the other camera is angled toward the other side of the chassis. Preferably, the fields of view of the surveillance cameras combined with the field of view of the platform camera provide approximately a 180° field of view.

Preferably, the surveillance or kiosk cameras are CCD cameras with 540 TVL resolution and a ⅓" DPS sensor. The lens may be, for example, a 3.7 mm pinhole lens providing a 90° viewing angle. Suitable cameras are manufactured by XTS Video, Inc. of Medley, Fla. Other CCD camera and digital IP cameras may be used as the kiosk cameras.

Analog data from the surveillance cameras can be recorded continuously via an analog to digital converter to the digital video recorder inside the chassis and looped depending on video storage capacity. Command center personnel can control the cameras remotely and view real time video streamed via the DVR over the Internet. The data may be stored, for example, on an SD card or other solid state recording media accessed from a rear panel in the chassis.

Internet connectivity can be provided to the VoIP phone, cameras, video recorder and other components requiring an Internet connection via a wired Ethernet connection through the back of the chassis. In addition, or as an alternative, a wireless Internet connection can be provided via a wireless access point or node, such as the ORiNOCO AP-8000 802.11n access point sold by Proxim Wireless Corporation.

Use of a wireless access point has the advantage of enabling the connection of multiple intercoms to a single wired Internet access connection, reducing the need for wired connections. In addition, the wireless access points can communicate with other wireless devices to provide Internet connectivity. For example, trains can dump security information while in the station; public wireless access can be provided to individuals and transit personnel; and access to stream video to other networks, such as police networks, can be provided.

As noted earlier, the foregoing components, and in particular the heat generating components, can be provided in modules that are mounted in the chassis through openings in the rear of the chassis. The heat generating modules can include heat dissipation fins on their exterior surfaces, with the exterior fan being positioned to direct air across these fins to remove heat from the interior of the chassis. Utilizing this configuration, it is possible to provide a system with a sealed chassis to eliminate interior contamination from water, dust and dirt, and also significantly reduce damage from vandalism.

A light source is mounted behind the beacon lens to aid in location of the system. Preferably, the light source is comprised of a plurality of LEDs. In a preferred embodiment, LEDs are mounted at each end of a vertical light pipe, which is centrally located behind the transparent beacon lens, thereby providing uniform 180° illumination along the length of the lens. The light pipe and LEDs may be mounted between upper and lower plates in a modular chassis enabling easy removal for servicing. The LEDs may require less than 12 Watts, so that the LEDs can be powered by POE) Power-over-ethernet).

BRIEF DESCRIPTION OF THE DRAWINGS

FIG. 1 is a front view of the intercom.
FIG. 2 is a side view of the intercom.
FIG. 3 is a rear view of the enclosure rear wall.
FIG. 4 is a sectional front view of the intercom without the enclosure front wall.
FIG. 5 is a sectional side view of the intercom with the facing side of the front wall removed.
FIG. 6 is a sectional top view of the locked intercom along a cut between module plates.
FIG. 7 is a sectional top view of the opened intercom along a cut across a module plate.
FIG. 8 is a sectional side view of the beacon.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

As illustrated, a preferred embodiment of the intercom, generally 10, is comprised of an enclosure, generally 12, enclosing a plurality of operative components configured as modules as described hereinafter. Enclosure 12 is comprised of an extruded chassis, generally 14, having a curved front wall 16 with side edges 18 and 20, and a back wall 22 integrally formed with front wall 16 together forming an interior cavity to receive various system modules. Back wall 22 is inset with respect to front wall side edges 18 and 20. Enclosure 12 further includes upper and lower caps 24 and 26, respectively. Enclosure 12 is attached to a wall mounting plate 28 by hinge 30 attached to plate 28 and edge 18 of enclosure 12, leaving a passageway between the front face of mounting plate 28 and the rear face of back wall 22 to allow for air flow. Lock 32 releasibly secures edge 20 of enclosure 12 to plate 28.

Curved front wall 16 includes an upper cutout 36 to receive a transparent viewing plate 38 curved to the profile of front wall 18. Preferably, plate 38 is tinted to prevent viewing of the interior of enclosure 12 from the exterior. Front wall 16 also includes an interface panel cutout 40 below cutout 36 to receive an interface panel 42. Panel 42 is preferably made of a resistant material, such as solid surface acrylic sold under the trademark Corian.

Back wall 22 includes various cutouts or openings for mounting of modules to be described in greater detail hereinafter. Use of these modules, preferably axially aligned, enables easy and rapid repair, maintenance and upgrading of the system. In addition, sealing of the modules within the housing eliminates dust and water contamination. Each module includes a mounting plate designed for watertight attachment to back wall 22 around the module opening. System components are mounted on the inner face of the mounting plate or are accessible through the mounting plate cutout.

Panel 42 includes various openings for mounting two-way communication components. These components include speaker 46, microphone 48, an emergency pushbutton 50, and an information pushbutton 52. Pushbuttons 50 and 52 are surrounded by LED lighted indicator rings 56 and 58, respectively, using LEDs of different colors to indicate the call status.

Pushbuttons 50 and 52 are connected to a hands-free VoIP phone 60 mounted behind interface panel 42 on intercom module plate 62 mounted over chassis cutout 66. VoIP phone 60 is pre-programmed to connect via the Internet to the appropriate authorities depending on whether pushbutton 50 or 52 is pushed.

Panel 42 also includes a view port 68 behind which is mounted a first analog camera 70, referred herein as the kiosk camera, aligned for viewing of the area immediately in front of interface panel 42, thereby enabling the viewing of users of the intercom. Camera 70 can be activated remotely or can be programmed to be always on. Data from camera 70 is recorded onto storage media in a digital video recorder 76 mounted behind video module plate 78. Storage may be on an SD card accessible via SD card access plate 80 in the back of module 70.

In the preferred embodiment, intercom 10 also includes surveillance cameras 82 and 86 mounted in the upper part of chassis 14 behind transparent panel 38. One camera is directed toward one side of enclosure 12, while the other camera is directed toward the opposite side of enclosure 12. Cameras 82 and 86 in combination with kiosk camera 70 provide a 180° view of the area in front of and to the sides of enclosure 12. Data from cameras 82 and 86 is also sent to DVR 76 for storage and/or can be streamed via the Internet to a remote location.

Power and Internet connections to the system are provided via connector cables 88 connected to system 10 via connectors on input/output module plate 90. AC power is converted to 12 and 48 VDC via rectifier 92 and fed to the system via an uninterruptable power supply (UPS) 94. In the event of a power failure, power is supplied from storage batteries 104. Cameras 70, 82 and 86 are powered via POE through their Internet connections.

Heat generated within the sealed housing both from internal electrical components and thermal conductivity when the system is mounted in sunlit areas must be dissipated for proper running of the intercom. In the preferred embodiment, an internal fan 98 mounted adjacent rectifier 92, one of the major heat generating components, circulates air throughout the system to provide uniformity.

Removal of heat from enclosure 12 is provided by blower 100 mounted on the exterior of blower module plate 102. Blower 100 is rotated by motor 106 inside enclosure 12, attached to blower 100 by shaft 108 extending through the wall of blower module plate 102. Blower 100 directs air upwardly across cooling fins 110 on the exterior of module plate 96, thereby conductively removing heat from the interior of enclosure 12.

Assistive audio is provided via a first telecoil 112 mounted behind interface panel 42 and a second telecoil 116 mounted in the top of enclosure 12. Telecoils 112 and 116 are driven by induction loop driver/amplifier 118 mounted behind intercom module plate 62. Dual telecoils avoids null coverage areas and the location of the telecoils in this manner avoids the prior need to mount telecoils directly above, or in the floor below, the user.

The preferred embodiment also includes a wireless access point 120 mounted behind wireless module plate 112 along with wireless antenna 126, allowing communication with the Internet and other wireless access points. As a result, when employing multiple intercoms in an area, only one intercom requires wired attachment to the Internet.

As illustrated in FIG. 8, beacon, generally 128, is comprised of a vertical light pipe 130 having inwardly directed LEDs 132 and 134 at each end. Beacon 128 is mounted between upper and lower modular mounting plates 136 and 138, respectively, accessible through the back of the chassis for ease of maintenance. LEDS 132 and 134 may be single color LEDs or infinitely controlled RGB LEDs. LEDs 132 and 134 are powered via POE.

In operation, a user of intercom 10 simply pushes button 50 or 52, depending upon whether the call is to report an emergency or to request information. VoIP phone 60 then automatically dials the appropriate authority using a pre-programmed number. When the connection is completed, a two-way conversation can be conducted using speaker 46 and microphone 48. If the user is wearing a telecoil enabled hearing aid, the call can be amplified using telecoils 112 and 116 with amplifier 118.

During the call, the authorities can observer the user over kiosk camera 70, if there is streaming of the camera data, or the data can be recorded using digital video recorder 76. In the same manner, the authorities can view and/or record the video data from cameras 82 and 86, providing a full view of the area in front of and to the sides of intercom 10. Camera 70 and/or cameras 82 and 86 can also be programmed to acquire data, either continuously or in response to a sensed event, for streaming and/or storage when the kiosk is not in use.

Certain modifications and improvements will occur to those skilled in the art upon a reading of the foregoing description. For example, other modular components, such as a parking meter module, or a ticket receipt module, can be incorporated into the system. It should be understood that all such modifications and improvements have been deleted herein for the sake of conciseness and readability but are properly within the scope of the following claims.

What is claimed is:

1. An improved enclosure for a publicly usable intercom comprised of:
   a) an monolithic chassis having a front wall, a rear wall, and an interior cavity, said front wall having a cutout to receive an interface panel, and said rear wall having a plurality of cutouts to insert system modules into said cavity;
   b) a mounting plate hinged to said chassis;
   c) a plurality of watertight covers releasibly attached over said rear wall cutouts; and
   d) upper and lower caps attachable to said chassis.

2. The enclosure of claim 1, wherein said rear wall includes a rear face and said mounting plate includes a front face spaced from the rear face if said rear wall, defining an air passageway between said mounting plate and rear wall.

3. The enclosure of claim 1, wherein said front wall is curved with rearwardly extending side edges, and said rear wall has side edges integral with said side edges.

4. The enclosure of claim 1, wherein said chassis is extruded aluminum.

5. The enclosure of claim 1, wherein said chassis further includes a cutout to receive a curved transparent viewing plate.

6. An improved public intercom system comprised of:
   a) a sealed enclosure including an extruded chassis having a front wall a rear wall, an interior cavity, and end caps attachable to said chassis, said front wall having a cutout to receive an interface panel, and said rear wall having a plurality of cutouts to receive module cover plates;
   b) an interface panel mounted in said front wall interface panel cutout; and
   c) a plurality of module cover plates attached over said rear wall cutouts for accessing intercom component within said cavity.

7. The system of claim 6, further including a blower located on said rear wall oriented to direct air across said cover plates to extract heat from said enclosure interior.

8. The system of claim 7, wherein said blower is located adjacent the lower end of said rear wall and at least one plate includes protrusions located above and adjacent to said blower.

9. The system of claim 6, further including a fan located within said enclosure to circulate air within said enclosure.

10. The system of claim 7, further including a mounting plate hinged to said enclosure, said mounting plate being spaced from said enclosure rear wall to provide an air passageway, said blower directing air upwardly through said passageway.

11. An improved public intercom system comprised of:
    a) an extruded chassis having a curved front wall with rearwardly extending side edges, a rear wall with side edges integral with said side wall, and end caps attachable to said chassis, and an interior cavity defined by said walls, said front wall having a cutout to receive an interface panel, and said rear wall having a plurality of aligned cutouts to receive module cover plates;
    b) an interface panel mounted in said front wall interface panel cutout, said interface panel including a speaker, a microphone, a call initiation means, and a camera positioned to acquire images of the area in front of the interface panel;
    c) a plurality of module cover plates attached over said rear wall cutouts to provide access to modular intercom components, one of said cover plates including an outer surface with heat dissipation protrusions;
    d) a modular, two-way communication means mounted on one of said module plates within said cavity, said communication means being programmed to initiate a call to a pre-programmed telephone number upon receipt of a command from the call initiation means; and
    e) a blower located on said rear wall adjacent said plate with protrusions, said blower being oriented to direct air across said protrusions to extract heat from said enclosure interior.

12. The system of claim 11, further including a transparent viewing plate and first and second surveillance cameras mounted within said chassis behind said transparent plate, said cameras being angled toward opposite sides of said enclosure.

13. The system of claim 11, further including video data storage means to store images received from one or more cameras.

14. The system of claim 11, further including an uninterruptable power supply operatively associated with system components and powered from an external power source.

15. The system of claim 11, wherein said two-way communication means is a VoIP phone and said system further includes an Internet connection to said VoIP phone and said camera.

16. The system of claim 11, further including a wireless access point enabling wireless communication with other intercoms.

17. The system of claim 11, further including a pair of spaced telecoils driven by an audio induction loop driver to assist the hearing impaired, one of said telecoils being mounted in said interface panel, and one of said telecoils being mounted in the upper end of said enclosure.

18. An improved public intercom system comprised of:
    a) an extruded aluminum chassis having a curved front wall, a rear wall integral with said side wall, and a cavity defined by said front and rear walls, said front wall having cutouts to receive an interface panel and a transparent viewing plate, and said rear wall having a plurality of axially aligned cutouts to receive module cover plates;
    b) an interface mounted in said front wall interface panel cutout, said interface panel including a speaker, a microphone, a call initiation means, and a camera positioned to acquire images of the area in front of the interface;
    c) a plurality of module cover plates attached over said rear wall cutouts to provide access to modular intercom components;
    d) a VoIP phone mounted on the inner surface of one of said module plates, said VoIP phone being programmed to initiate a call to a pre-programmed telephone number upon receipt of a command from the call initiation means;
    e) heat dissipation means to remove heat from the interior of said chassis;
    f) a transparent viewing plate mounted in said chassis viewing plate cutout;
    g) first and second surveillance cameras mounted within said chassis cavity behind said transparent plate, said cameras being angled toward opposite sides of said enclosure;
    h) modular video recording means mounted within said cavity to store images received from said interface panel camera and said surveillance cameras; and
    i) an uninterruptable power supply powered from an external power source mounted within said cavity and operatively associated with system components.

19. The system of claim 18, further including a wireless access point enabling wireless Internet communication.

20. The system of claim 18, further including a pair of spaced telecoils driven by an audio induction loop driver/amplifier to assist the hearing impaired, one of said telecoils being mounted in said interface panel, and one of said telecoils being mounted in the upper end of said chassis.

* * * * *